(12) United States Patent
Zhang

(10) Patent No.: US 8,336,225 B1
(45) Date of Patent: Dec. 25, 2012

(54) COUNTERBORE HOLE CHAMFER DEPTH MEASURING APPARATUS AND METHOD

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/207,445

(22) Filed: Aug. 11, 2011

(30) Foreign Application Priority Data

Jun. 3, 2011 (CN) .......................... 2011 1 0148828

(51) Int. Cl.
*G01B 5/18* (2006.01)
(52) U.S. Cl. ........................................... 33/836; 33/542
(58) Field of Classification Search .................... 33/542, 33/832, 836
See application file for complete search history.

(56) References Cited

U.S. PATENT DOCUMENTS

| | | | | |
|---|---|---|---|---|
| 2,572,368 A * | 10/1951 | Minix | ............................... | 33/542 |
| 3,016,619 A * | 1/1962 | Mueller | ........................... | 33/836 |
| 3,103,748 A * | 9/1963 | Emery | ............................. | 33/542 |
| 3,826,010 A * | 7/1974 | Finley | .............................. | 33/836 |
| 4,289,382 A * | 9/1981 | Clark | ................................ | 33/832 |
| 4,419,830 A * | 12/1983 | Miller | .............................. | 33/542 |
| 5,979,069 A * | 11/1999 | Hayashida et al. | ............. | 33/832 |
| 6,698,105 B2 * | 3/2004 | Shen et al. | ..................... | 33/836 |
| 7,065,897 B2 * | 6/2006 | Luner et al. | .................... | 33/836 |
| 2009/0235546 A1 * | 9/2009 | Klepp | .............................. | 33/542 |
| 2012/0151788 A1 * | 6/2012 | Miller et al. | .................... | 33/836 |

* cited by examiner

*Primary Examiner* — G. Bradley Bennett
(74) *Attorney, Agent, or Firm* — Altis Law Group, Inc.

(57) ABSTRACT

A measuring apparatus for measuring a counterbore hole chamfer depth of a workpiece, includes a positioning member having a guiding hole aligned with the counterbore hole of the workpiece, a support member having a receiving hole aligned with the guiding hole, and a measuring device supported by the support member. The measuring device includes a gauge, a retractable pole connected to the gauge and extending into the receiving hole, and a measuring head portion connected to the retractable pole and movably received in the guiding hole. The measuring head portion has a cone-shaped end for abutting on an inner wall of the counterbore hole chamfer, thereby making the measuring head portion move back in the guiding hole and the retractable pole retract. The gauge is configured for calculating and displaying the depth of the counterbore hole chamfer based on the distance the retractable pole retracts.

6 Claims, 6 Drawing Sheets

COUNTERBORE HOLE CHAMFER DEPTH MEASURING APPARATUS AND METHOD

BACKGROUND

1. Technical Field

The present disclosure relates to a counterbore hole chamfer depth measuring apparatus and a related method.

2. Description of Related Art

In assembly of various devices, articles with counterbore holes are widely used for being connected to each other with counterbore head screws. The counterbore holes are usually chamfered for facilitating the mounting of the counterbore head screws. A depth of the counterbore hole chamfer needs to be checked, to ensure that heads of the screws are flush with the surrounding surface.

Currently, a caliper is usually used to test the counterbore hole chamfer depth. However, accurate placement of the caliper is not easily achieved, which can effect the precision of measuring the chamfer.

What is needed, therefore, is a counterbore hole chamfer depth measuring apparatus and method, which can overcome the above shortcomings.

BRIEF DESCRIPTION OF THE DRAWINGS

Many aspects of the present measuring apparatus and method can be better understood with reference to the following drawings. The components in the drawings are not necessarily drawn to scale, the emphasis instead being placed upon clearly illustrating the principles of the present measuring apparatus and method. Moreover, in the drawings, like reference numerals designate corresponding parts throughout the several views.

DETAILED DESCRIPTION

Embodiments of the present measuring apparatus and method will now be described in detail below and with reference to the drawings.

Figure 1:
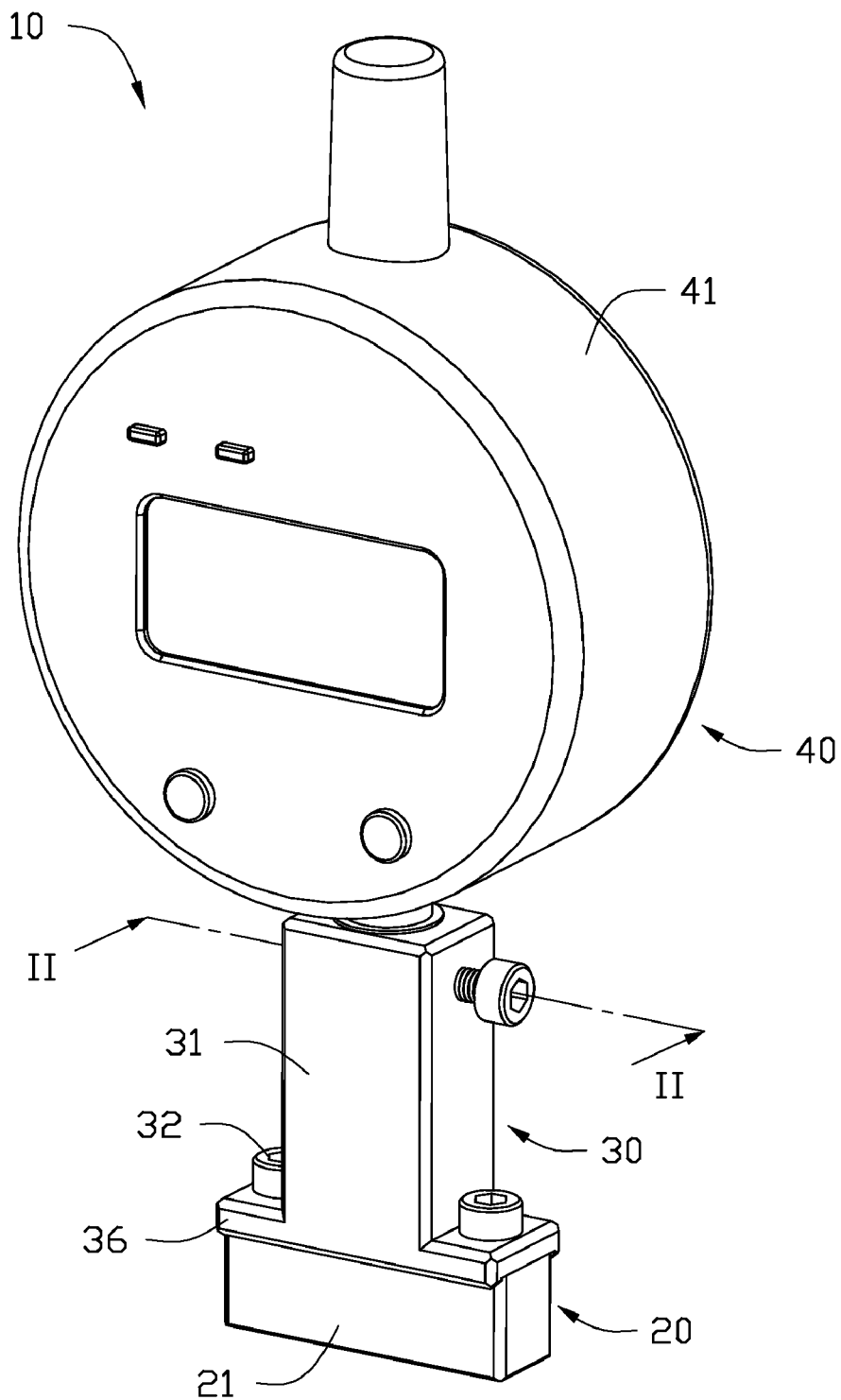
FIG. 1 is an isometric view of a counterbore hole chamfer depth measuring apparatus in accordance with an embodiment.

Referring to FIG. 1, a measuring apparatus 10 for whether a counterbore hole chamfer is done to the proper depth, includes a positioning member 20, a support member 30, and a measuring device 40.

Figure 2:
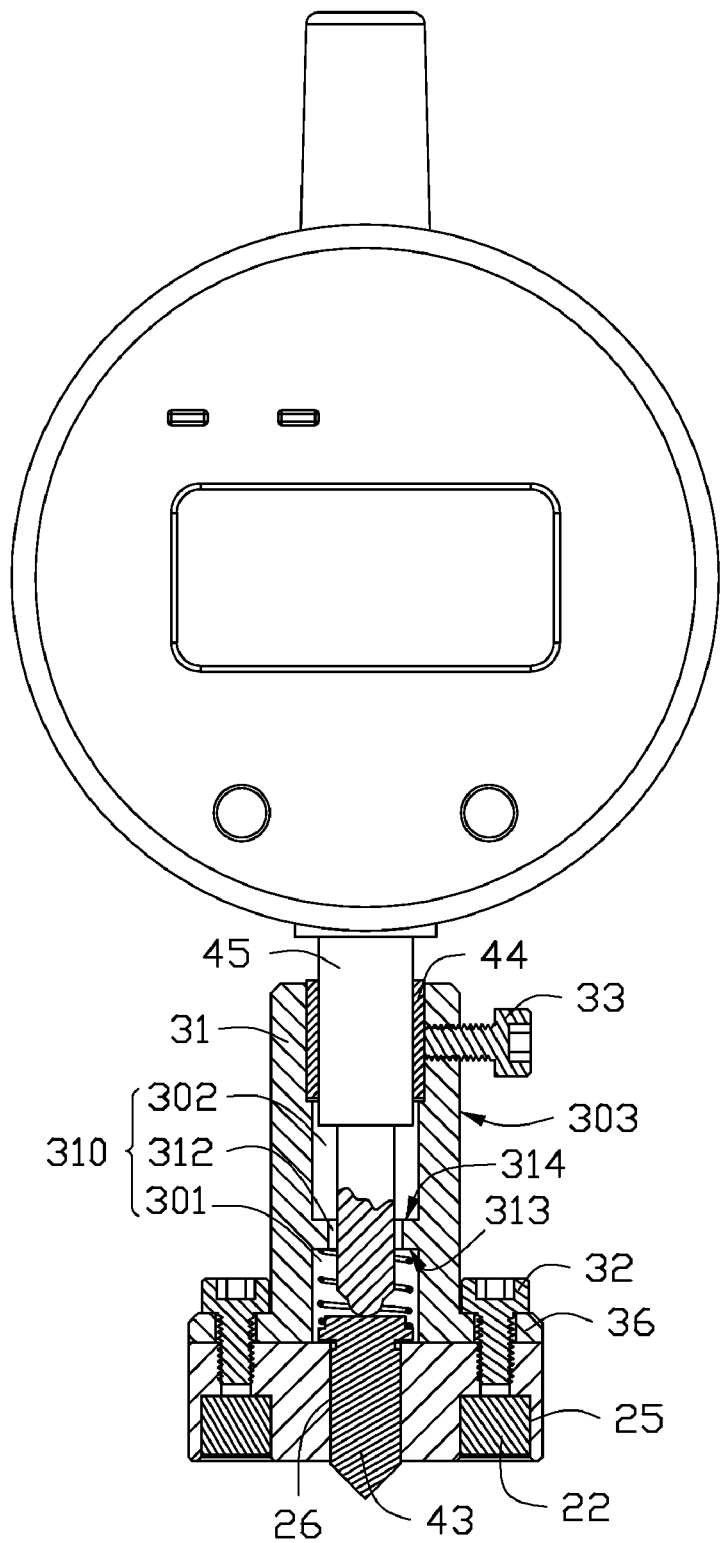
FIG. 2 is a cross-sectional view of the measuring apparatus of FIG. 1, taken along the II-II line.
Figure 3:
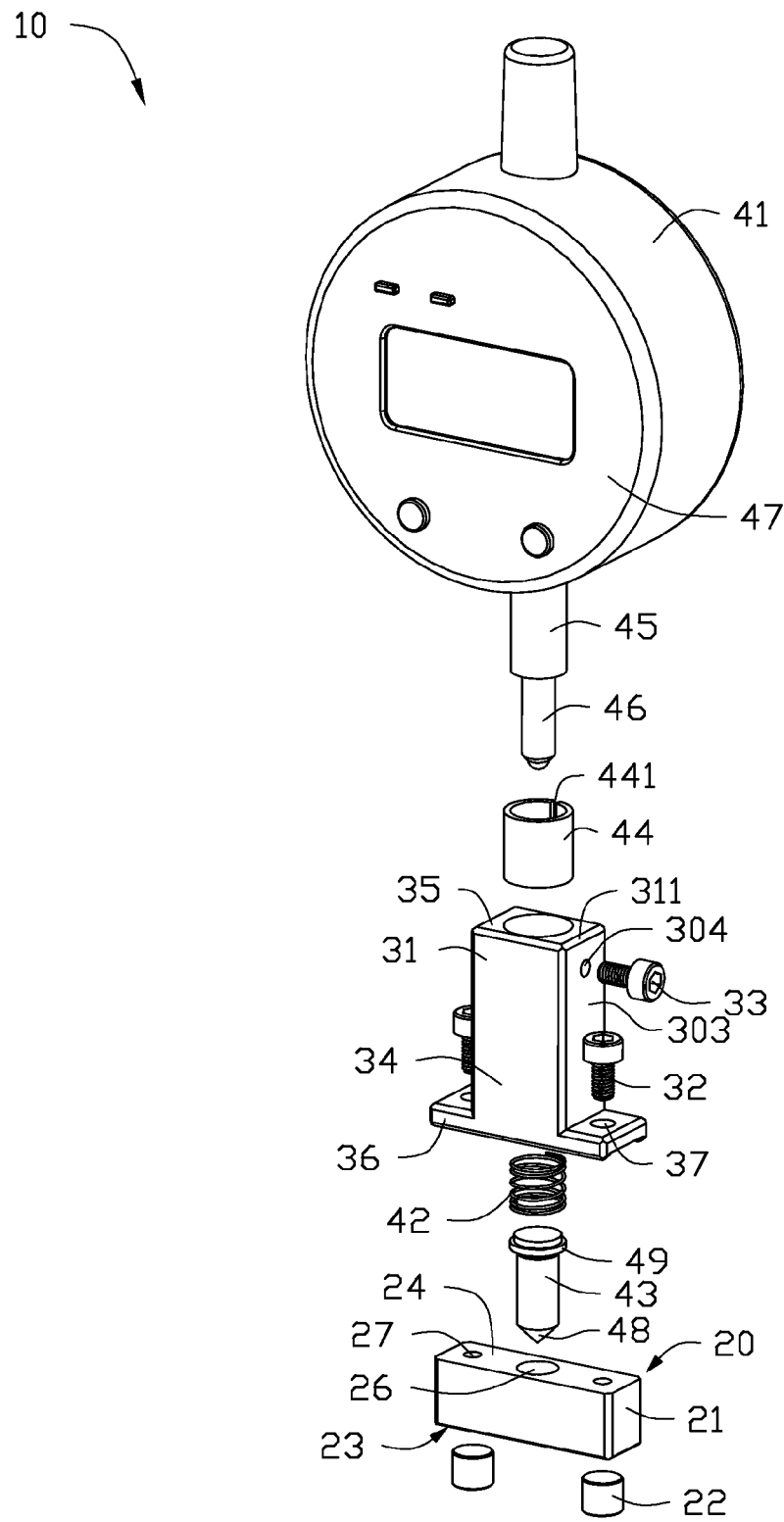
FIG. 3 is an exploded view of the measuring apparatus of FIG. 1.

Referring also to FIGS. 2 and 3, the positioning member 20 includes a guiding block 21 and two magnetic blocks 22. The guiding block 21 is substantially rectangular, and includes a first surface 23 and an opposite second surface 24. The guiding block 21 includes a guiding hole 26 defined through the first surface 23 and the second surface 24, two recesses 25 defined in the first surface 23, and two first engaging holes 27 defined in the second surface 24 and in communication with the recesses 25, respectively. A central axis of each of the first engaging holes 27 is aligned with that of the corresponding recess 25. The magnetic blocks 22 are completely received in the respective recesses 25 (see FIG. 2).

The support member 30 is fixed on the second surface 24 of the positioning member 20. The support member 30 includes a support block 31, two first screws 32, and a second screw 33. The support block 31 includes a main body 311 and two side blocks 36 extending from opposite sides of the main body 311. The main body 311 is substantially rectangular, and includes a first end 34 and a second end 35 along a lengthwise direction of the main body 311. The first end 34 is in contact with the second surface 24 of the guiding block 21. The side blocks 36 are located at the first end 34, and the side blocks 36 are in contact with the second surface 24. Each of the side blocks 36 has a second engaging hole 37 defined therein. Each of the second engaging holes 37 corresponds to one of the first engaging holes 27, and a central axis of the second engaging hole 37 is aligned with that of the corresponding first engaging hole 27. Each of the first screws 32 engages in one of the second engaging holes 37 and the corresponding first engaging hole 27, such that the support block 31 is fixed to the guiding block 21.

A receiving hole 310 is formed through the first end 34 and the second end 35 of the main body 311. The receiving hole 310 is composed of a first hole section 301 at the first end 34, a third hole section 302 at the second end 35, and a second hole section 312 located between the first hole section 301 and the third hole section 302. A diameter of the first hole section 301 is substantially equal to the that of the third hole section 302, and is greater than that of the guiding hole 26. A diameter of second hole section 302 is less than that of the first hole section 301 and that of the third hole section 302, such that a first step surface 313 is formed between the first hole section 301 and the second hole section 312, and a second step surface 314 is formed between second hole section 312 and the third hole section 302. The first step surface 313 is exposed at the first hole section 301, and the second step surface 314 is exposed at the third hole section 302.

A threaded hole 304 is defined in a sidewall 303 of the main body 311, in communication with the third hole section 302. The second screw 33 is engaged in and extends through the threaded hole 304.

The measuring device 40 includes a measurement instrument 41, a spring member 42, a measuring head portion 43, and a sleeve 44. The measurement instrument 41 includes a gauge 47, a sheath 45 and a retractable pole 46 extending through the sheath 47 and connected to the gauge 47. The gauge 47 indicates how far the retractable pole 46 is extended or retracted, and a zero point can be marked. The measuring head portion 43 has a proximal end 48 and an opposite distal end 49. The proximal end 48 has a cone with a cone angle less than the counterbore hole chamfer angle α of the workpiece 50 (see FIG. 4). The measuring head portion 43 is movably received in the guiding hole 26 of the guiding block 21, and the proximal end 48 extends through the guiding hole 26. The distal end 49 is columnar, and a diameter of the distal end 49 is greater than that of the guiding hole 26. The retractable pole 46 extends through the sheath 45 and extends into the receiving hole 310. The end of the retractable pole 46 is connected to the distal end 49. The spring member 42 is received in the first hole section 301, and has a first end connected to the distal end 49 and a second end abutting on the first step surface 313. The spring member 42 can be in an uncompressed state when no force is applied to the measuring head portion 43.

The sleeve 44 is substantially cylindrical, and has an opening 441 defined in a sidewall along a lengthwise direction thereof. The sleeve 44 is received in the third hole section 302, and the sheath 45 is received in the sleeve 44. The second screw 33 extends through the threaded hole 304 and abuts on the sleeve 44, such that the measurement instrument 41 is fixed on the support member 30.

Figure 4:
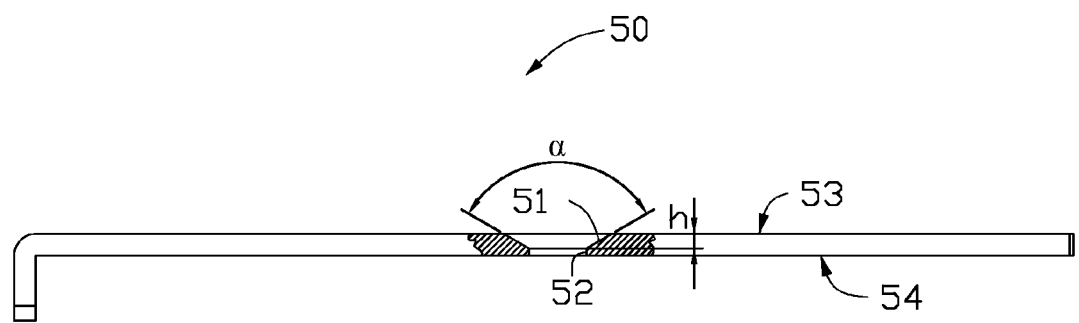
FIG. 4 is schematic view of a workpiece having a counterbore hole chamfer.

Referring to FIG. 4, in application, a workpiece 50 to be tested is provided. The workpiece 50 includes a counterbore hole chamfer 51 exposed to a first surface 53 and a bottom hole 52 exposed to an opposite second surface 54. The counterbore hole chamfer 51 and the bottom hole 52 form a counterbore hole, and the counterbore hole chamfer 51 forms a step between the counterbore hole chamfer 51 and the bottom hole 52. A depth h of the counterbore hole chamfer 51 is to be measured.

Figure 5:
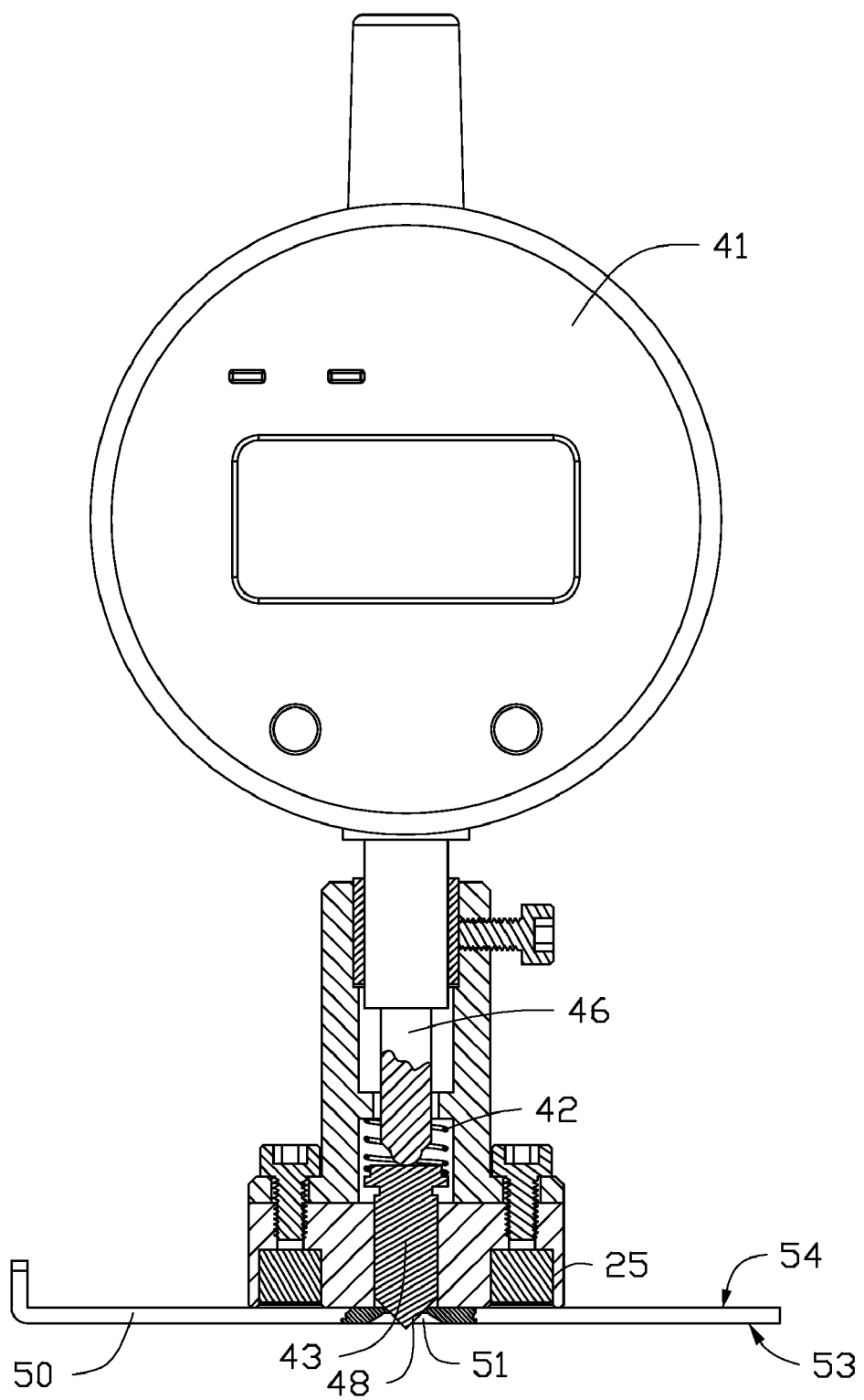
FIG. 5 and FIG. 6 show steps of measuring the counterbore hole chamfer depth of the workpiece of FIG. 4 with the measuring apparatus shown in FIG. 2.

Firstly, referring also to FIG. 5, the workpiece 50 is placed under the guiding block 21, with the second surface 54 which the bottom hole 52 exposed to face toward the guiding block 21. The magnetic blocks 22 can help to position the workpiece 50 if the workpiece 50 is metallic, and if the workpiece 50 is non-metallic, force can be applied between the workpiece 50 and the guiding block 21 to help position the workpiece 50.

As the proximal end 48 of the measuring head portion 43 protrudes out of the guiding hole 26, the proximal end 48 first contacts the second surface 54 of the workpiece 50. However, as the measuring head portion 43 can move in the guiding hole 26, and the retractable pole 46 can retract, the measuring head portion 43 together with the retractable pole 46 will move back until the first surface 23 of the guiding block 26 contacts the second surface 54 of the workpiece 50.

The gauge 47 can store the movement distance, i.e., the retracted distance of the retractable pole 46. In order to obtain the depth h of the counterbore hole chamfer 51, this retracted distance is set to zero.

Figure 6:
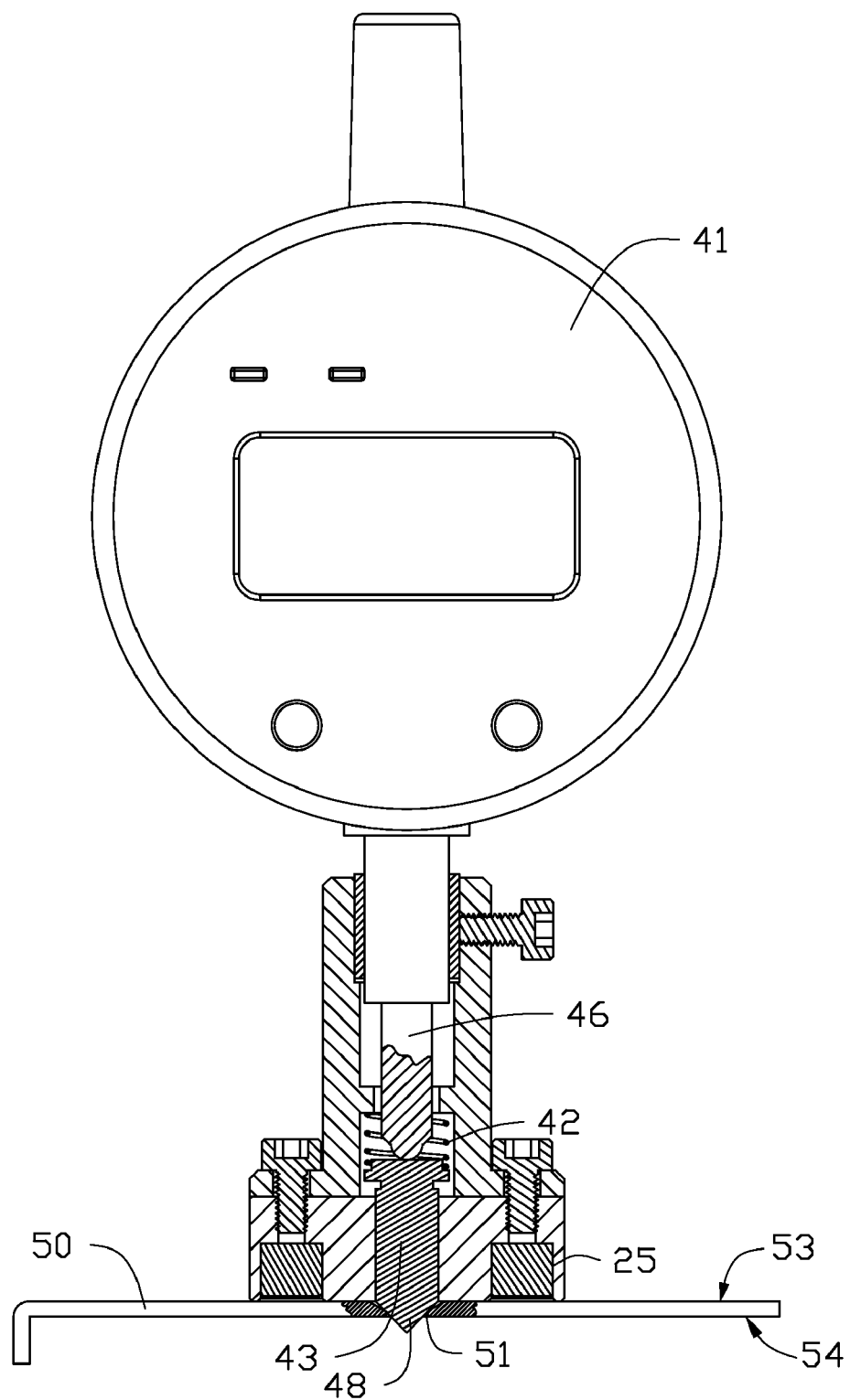

Next, referring also to FIG. 6, the workpiece 50 is turned over, with the first surface 53 from which the counterbore hole chamfer 51 is exposed, faces the guiding block 21. Before the proximal end 48 extends into the counterbore hole chamfer 51, the spring member 42 restores the measuring head portion 43 together with the retractable pole 46 move to an original position. The proximal end 48 of the measuring head portion 43 may contact an inner wall of the counterbore hole chamfer 51 as the proximal end 48 extends into the counterbore hole chamfer 51. However, as the measuring head portion 43 can move in the guiding hole 26, and the retractable pole 46 can retract, the measuring head portion 43 together with the retractable pole 46 will move back until the first surface 23 of the guiding block 26 contacts the first surface 53 of the workpiece 50.

At this time, the gauge 47 can show a retracted distance relative to the previous retracted distance. As the previous retracted distance is set to zero, any difference is the depth of the counterbore hole chamfer 51. The relative measurement makes the measuring of the counterbore hole chamfer depth more precise.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A measuring apparatus for measuring a counterbore hole chamfer depth of a workpiece, comprising:
   a positioning member configured for positioning the workpiece, the positioning member comprising a guiding hole for alignment with the counterbore hole of the workpiece;
   a support member positioned on the positioning member, the support member comprising a receiving hole aligned with the guiding hole; and
   a measuring device supported by the support member, the measuring device comprising a gauge, a retractable pole connected to the gauge and extending into the receiving hole, and a measuring head portion connected to the retractable pole and movably received in the guiding hole, the measuring head portion having a cone-shaped end with a cone angle less than a chamfer angle of the counterbore hole, the cone-shaped end extending through the guiding hole and configured for abutting an inner wall of the counterbore hole chamfer, thereby making the measuring head portion moving back in the guiding hole and the retractable pole retracted a distance, the gauge configured for calculating and displaying a depth of the counterbore hole chamfer based on the retracted distance of the retractable pole.

2. The measuring apparatus of claim 1, wherein the positioning member comprises a guiding block and a plurality of magnetic blocks, the guiding block includes two recesses for facing the workpiece, the guiding hole is formed in the guiding block, the magnetic blocks are entirely received in the respective recesses and configured for magnetically attracting the workpiece.

3. The measuring apparatus of claim 1, wherein the measuring device further comprises a spring member having a first end connected to the measuring head portion, and an opposite second end abutting on an inner wall of the receiving hole.

4. The measuring apparatus of claim 3, wherein the receiving hole includes a first hole section adjacent to the positioning member, an opposite second hole section, and a third hole section located between the first hole section and the second hole section, a diameter of the third hole section being less than that of the first hole section and that of the second hole section, thereby forming a first step between the first hole section and the third hole section and a second step between the second hole section and the third hole section, the second end of the spring member abutting on the first step.

5. The measuring apparatus of claim 1, wherein the measuring device further comprises a sheath surrounding the retractable pole, and a sleeve receiving the sheath, the sleeve being positioned on the support member.

6. A method for measuring a counterbore hole chamfer depth of a workpiece, comprising:
   providing a measuring apparatus of claim 1;
   providing a workpiece having a counterbore hole having a counterbore hole chamfer exposed at a first surface of the workpiece and a bottom hole exposed at an opposing second surface of the workpiece;
   attaching the workpiece to the positioning member with the second surface of the workpiece facing toward and contacting the positioning member, thereby the cone-shaped end of the measuring head portion and the retractable pole being retracted a first distance;
   setting the gauge back to zero;
   attaching the workpiece to the positioning member with the first surface of the workpiece facing toward and contacting the positioning member, thereby the cone-shaped end of the measuring head portion and the retractable pole retracted a second distance;
   calculating a depth of the counterbore hole chamfer depth based on the second distance using the gauge; and
   displaying the depth of the counterbore hole chamfer depth on the gauge.

* * * * *